United States Patent [19]
Hunter et al.

[11] 3,735,772
[45] May 29, 1973

[54] WATER VALVE APPARATUS

[75] Inventors: Edwin J. Hunter; Joseph Walto, both of Riverside, Calif.

[73] Assignee: Toro Manufacturing Corporation, Riverside, Calif.

[22] Filed: May 20, 1971

[21] Appl. No.: 145,284

[52] U.S. Cl. ........................137/15, 251/30, 251/44
[51] Int. Cl. .............................................F16k 31/40
[58] Field of Search .....................251/44, 30; 137/15

[56] References Cited

UNITED STATES PATENTS

| | | | |
|---|---|---|---|
| 2,759,488 | 8/1956 | Garrett | 251/43 X |
| 2,914,086 | 11/1959 | Beller | 251/44 X |
| 962,551 | 6/1910 | Conrader | 251/44 X |
| 3,424,427 | 1/1909 | Ruchser | 251/44 X |
| 2,613,689 | 10/1952 | Clausen | 251/44 |

*Primary Examiner*—Allen Cohan
*Attorney*—Miketta, Glenny, Poms & Smith

[57] ABSTRACT

The water valve apparatus has a subassembly of molded plastic valve actuator parts provided within a brass valve housing including a body having inlet and outlet chamber divided by a ported partition, a threaded cap including electrically or hydraulically operated internal pressure controlling means and a flow control stem assembly mounted on the cap. The apparatus subassembly of internal parts includes a one-piece molded cylindrical insert means having an upper threaded neck portion for removable connection into the cap and a depending cylindrical skirt positioned within the valve body inlet chamber upon assembly of the cap to the valve body. Piston means, including nested inner and outer cup-like members clamping a ring seal means between flanges thereof, are provided within the cylinder with a valve closure member fastened to the underside of the piston means and a control rod slidably mounted within a web of the cylinder insert means seated within the inner cup-like member of the piston means and biasing it via associated spring means into a valve closure position. In the first exemplary embodiment, port means are provided through the piston means to allow inlet water pressure to operate the piston means within the associated insert cylinder means to a valve closed position subject to selective venting thereof via an electrically operated valve in the valve housing. In an alternative embodiment, a hydraulic line is associated with the valve housing for selectively applying pressure within the cylinder insert means to force the piston means into a valve closed position or allow it to move to an open valve position under the urging of inlet water pressure.

10 Claims, 7 Drawing Figures

INVENTORS.
EDWIN J. HUNTER
JOSEPH WALTO
BY
Miketta, Glenny, Poms & Smith
ATTORNEYS.

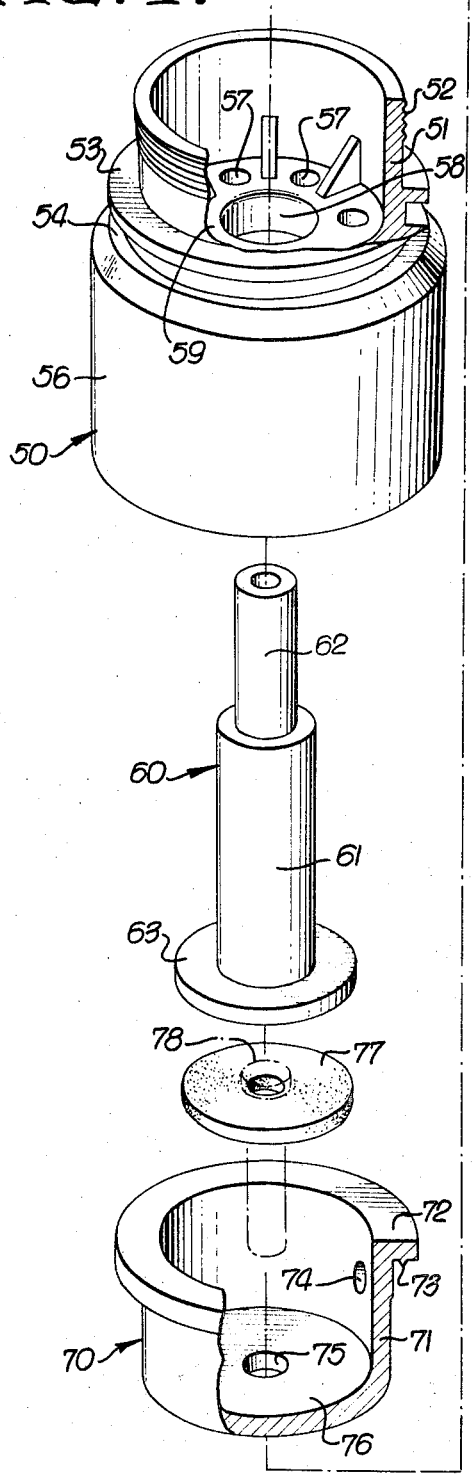
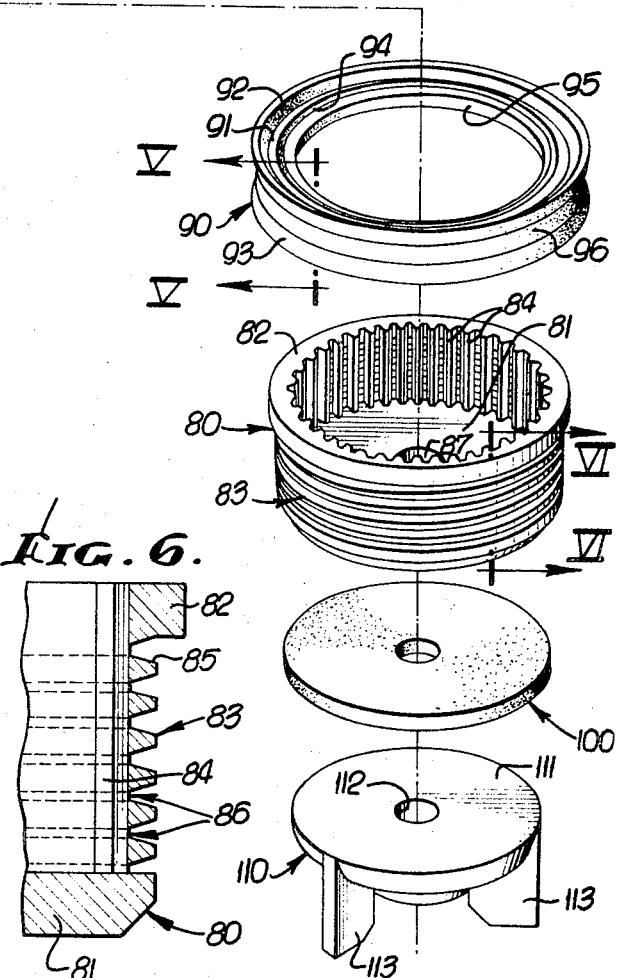
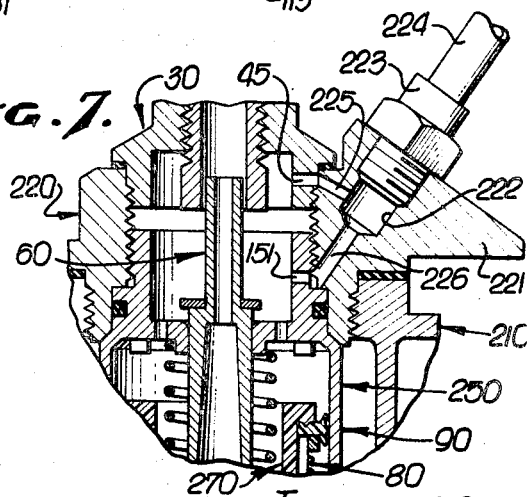
FIG. 4.
FIG. 6.
FIG. 7.
INVENTORS.
EDWIN J. HUNTER
JOSEPH WALTO
BY
Miketta, Glenny, Poms & Smith
ATTORNEYS.

WATER VALVE APPARATUS

BACKGROUND OF THE INVENTION

The improvement in water valve apparatus of the present invention is in general directed to water valves employed in water sprinkling or irrigation systems. In both commercial and residential water sprinkling or irrigation systems, it has been conventional heretofore to employ electrically or hydraulically operated controllers or timing devices for selectively opening and closing remotely located automatically operated water line valves to selectively operate sprinklers in various areas of the system. Such automatic water valves employed heretofore have generally utilized a diaphragm within the valve body which is associated with a closure or stopper normally closing a valve port between an inlet and outlet of the valve body. Means have generally been employed in these valves for introducing inlet line water pressure to a cavity within the valve housing above the diaphragm to normally force the associated valve closure member into a closed position. This has been accomplished by providing a larger pressure area above the diaphragm than below upon which the inlet water pressure may act. These valves have been electrically operated to an open position by employing conventional solenoid operated valves in association with a vent passage connected between the cavity within the housing above the diaphragm and either the exterior of the valve or the downstream line or outlet of the valve. Other similarly constructed diaphragm actuated valves have employed a hydraulic line connection for selectively pressuring the area above the diaphragm to maintain the valve closed or allowing it to open under the influence of the upstream line pressure.

Originally, such automatic water valve devices were made of metal, either cast iron or preferably brass since the latter is more easily machinable. However, because a plurality of internal operating parts have been required for the construction of these automatic valves, efforts have been made to replace the use of machined brass or cast metal parts for easily molded and worked plastic parts. Some efforts have been made to utilize a brass valve body with a generally all plastic cap and valve actuating mechanism which is threadably screwed into the open topped valve body. We have found that various problems have arisen with this type of valve, particularly in the area of obtaining and maintaining a tight water seal between such plastic part assemblies and the associated brass body. Further, when such plastic parts have been employed, they are susceptible to damage from being impacted by tools, garden equipment, etc. normally operated in the vicinity of these valves.

It is therefore the primary object of the present invention to disclose and provide an improvement in water valve apparatus wherein an all metal valve housing, preferably including a brass valve body and cap or cover closure therefor in order to obviate externally applied damage to the valve apparatus and to still obtain the advantages of the less costly, easily worked aspects of plastic molded parts for the internally operating portions of the valve apparatus. More particularly, it is the primary object of the present invention to disclose and provide an internal subassembly of movable, generally molded plastic parts which can be easily assembled into a brass cap and valve body and will provide a durable long-lasting and trouble free water valve apparatus.

More specifically, it is an object of the present invention to disclose and provide a novel cylinder insert means made of a one-piece molded plastic member which can be easily mounted into the cover or cap of the valve housing for assembly to the valve body to provide a cylinder within the valve body inlet and to disclose and provide novel piston means, as well as means for mounting the same within such cylinder, for operating an associated closure member within the valve body in response to differential pressure within the cylinder above and below the piston means.

SUMMARY OF THE INVENTION

Generally stated, the water valve apparatus, according to the present invention, includes the provision of a cylinder insert means for insertion within the inlet chamber of an otherwise generally conventional water valve body to receive a piston means therein, such cylinder insert means including an upper portion releasably connectable into a cover means for the valve body with the interior of such cylinder in communication with a water passage in such cover means for either venting or introducing water or hydraulic fluid into a cylindrical portion of the insert means. Piston means are associated with a valve port closure member and are positioned within the cylinder for vertical movement therein under differential pressure conditions within the cylinder above and below the piston means.

More particularly, the piston means includes a pair of inner and outer nested, generally cup-like members having radially outwardly extending flanges at their open ends to receive and clamp a ring seal means therebetween. The ring seal means is dimensioned to seal, via associated wiper portions, along the inner surface of the cylinder. The outer piston member is preferably provided with a screen-like body portion to screen water flow through a single port provided within the inner piston member to allow introduction of inlet water pressure into the interior of the cylinder above the piston means.

Means are provided for positioning the piston means aforedescribed within the cylinder insert means aforedescribed including a control rod slidably positioned within the cylinder insert means and biased to seat downwardly within the inner cup-like member of the piston means. In addition, a seal retainer underlying the seal closure means secured thereby to the underside of the outer cup-like piston member is provided with depending guide fins which are vertically slidable through the valve body port so that the piston means is vertically aligned and slidable within the cylinder skirt under the combined action of said biased control rod and associated seal retainer guide fins.

The valve apparatus of the present invention may be operated as either an electrically or hydraulically operated valve apparatus utilizing the same basic molded plastic subassembly parts. The one-piece molded, preferably plastic, insert means, according to the present invention, is provided with an upper reduced or neck portion having exteriorly applied threads for easy connection into an otherwise standard brass valve body cap having an internally threaded bore. The cap and insert may thus be assembled to a valve body with the aforesaid piston means positioned by its associated seal retainer guide fins over the valve port and the aforedescribed control rod and associated spring means merely loosely seated within the inner piston member. The assembly of the cap and associated cylinder insert means onto the valve body, with the aforementioned seal retainer piston means and control rod positioned into the valve body completes the assembly of such internally working parts to the stationary surrounding metallic valve body housing.

A more complete and thorough understanding of the improvement in water valve apparatus, according to the present invention, will be afforded to those skilled in the art from a consideration of the following detailed explanation of a preferred and alternative exemplary embodiment of the invention herein. Reference will be made to the appended sheets of drawings.

DESCRIPTION OF THE DRAWINGS

FIG. 4 is an exploded view, in perspective, of the subassembly of parts shown assembled into the body and cover members of the apparatus of FIG. 1;

FIG. 6 is a vertical sectional view of the outer piston member shown in the exploded view of FIG. 4 taken therein along the plane VI—VI; and FIG. 7 is a detail view, in section, of an alternative exemplary embodiment of water valve apparatus according to the present invention.

Figure 1:
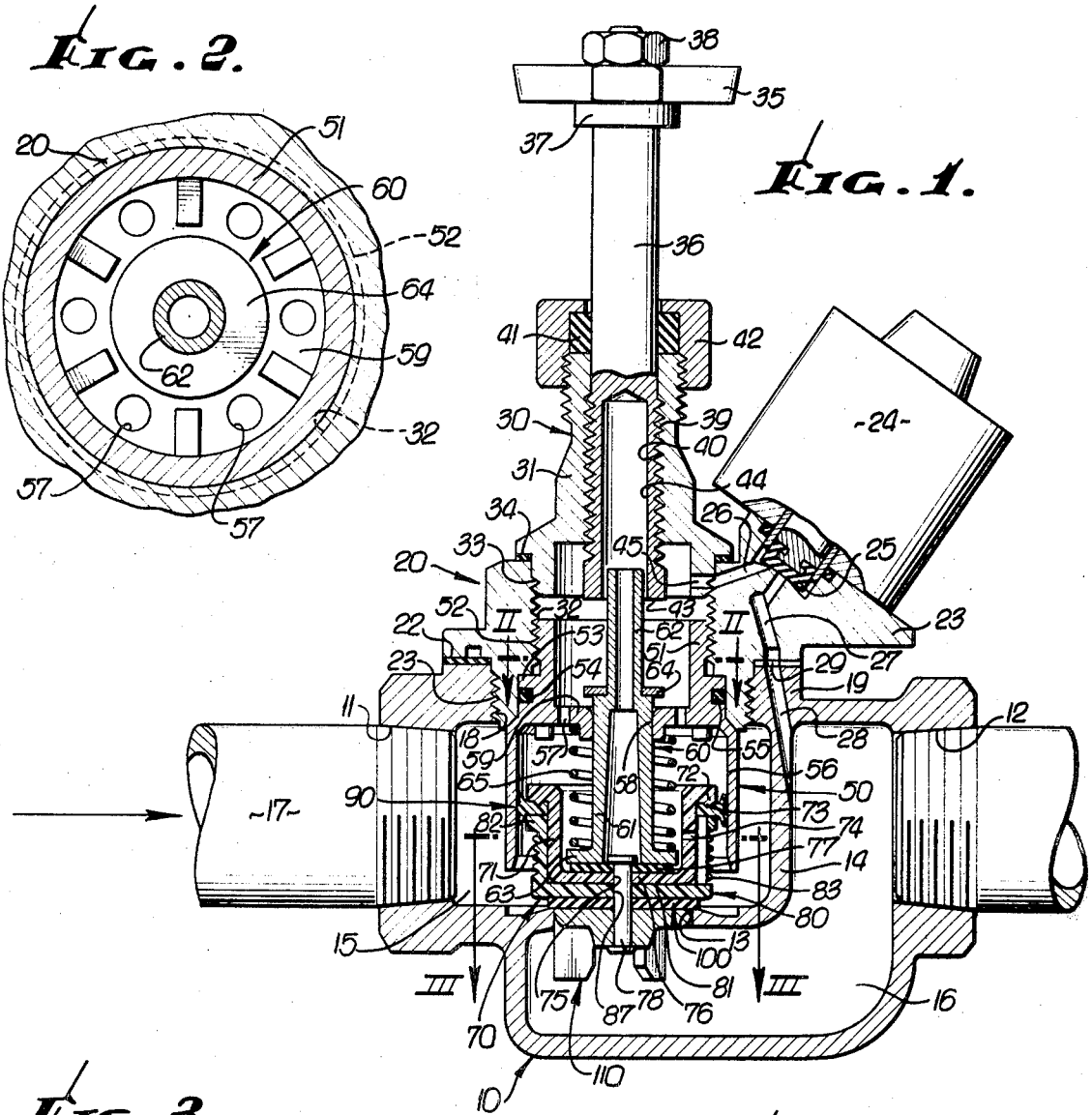
FIG. 1 is a side elevational view, partially in section, of an exemplary embodiment of water valve apparatus according to the present invention.
Figure 2:
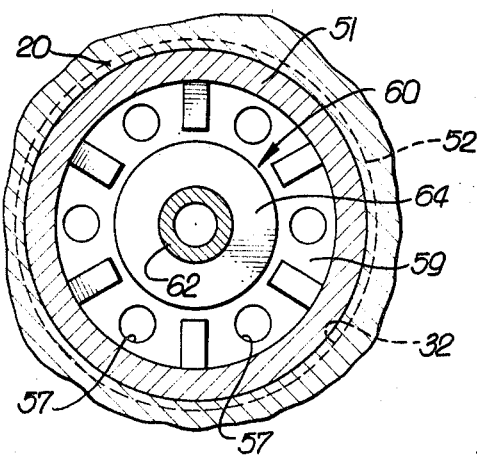
FIG. 2 is a horizontal detail sectional view of the apparatus of FIG. 1 taken therein along the plane II—II.
Figure 3:
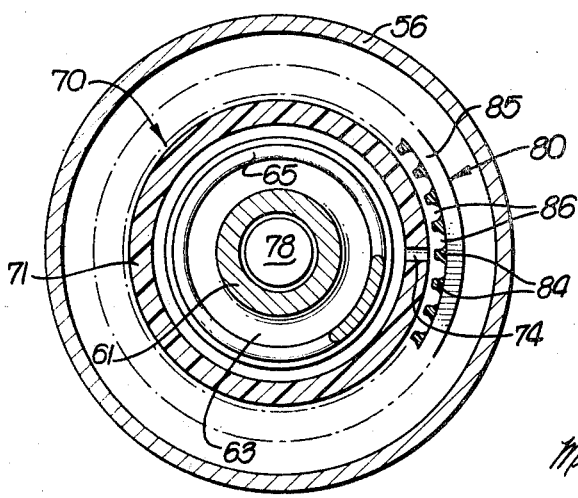
FIG. 3 is a horizontal cross-sectional detail view of the apparatus of FIG. 1 taken therein along the plane III—III.
Figure 5:
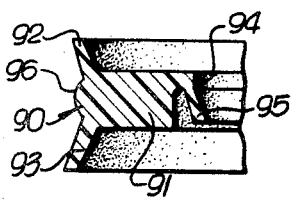
FIG. 5 is a detail view, in section, of the piston means ring seal of the apparatus of FIG. 1.

Referring first to the exemplary embodiment of FIGS. 1 through 6, and particularly to FIGS. 1 and 4, the exemplary embodiment of water valve apparatus, according to the present invention, generally includes the provision of a subassembly of plastic parts, as shown in FIG. 4, adapted to be incorporated into an otherwise generally conventional water valve body, indicated generally at 10, cap, indicated generally at 20, and water flow control stem assembly, indicated generally at 30. The body, cap and stem assembly may be made in conventional manner of metal, preferably brass, in order to produce a strong, durable and tightly assembled valve housing for the subassembly apparatus as hereinafter described.

As particularly contemplated within the present invention, a cylinder insert means, indicated generally at 50, is mounted to the cap 20 and receives a piston means therein comprising an inner piston member, indicated generally at 70, nested in an outer piston member, indicated generally at 80. These two nested piston members have cooperating flanges for clamping a ring seal, indicated generally at 90, therebetween. The piston means is positioned within the cylinder insert, indicated generally at 50, by a control rod, indicated generally at 60, whose vertical movement therein is limited by the positioning of the stem 36. As will be explained in detail hereinafter, the opening and closing of the associated valve closure member 100 is controlled by the reaction of the piston means under a differential water pressure between the inlet of the valve and the interior of the cylinder insert means.

The exemplary embodiments of FIGS. 1 through 6 will now be explained in detail.

DETAILED DESCRIPTION OF THE DISCLOSURE

Referring first to FIG. 1, an otherwise generally conventional valve body, indicated generally at 10, is preferably made of brass and is provided in conventional manner with an inlet 11, outlet 12 and a valve port 13 in a partition 14 which divides the valve body into an inlet chamber 15 and an outlet chamber 16. The inlet 11 and outlet 12 are shown connected into a water line 17 to regulate the water flow therethrough by the opening and closing of valve port 13 by the apparatus of the present invention. Body 10 is further provided with an upwardly opening threaded bore 18 in a boss 19 to receive cap 20 in conventional manner.

Cap 20, which is preferably also made of brass, is provided with a depending threaded coupling portion 21 adapted to be turned into the threaded bore 18 of the valve body with a conventional cap-body gasket 22 therebetween. A lateral flange or boss 23 is also shown provided in generally conventional manner in cap 20 foR mounting a solenoid operated valve, including the solenoid 24 and valve stopper 25, to regulate venting of the interior of the upper portions of the valve housing, as hereinafter explained, through the passages 26, 27 in the cap and passage 28 in the valve body. An appropriate port 29 is provided in gasket 22 to provide communication between the passages 27 and 28. Solenoid 24 may be operated by an electrical control to selectively operate the valve between open and closed positions on the urging of upstream water pressure as hereinafter explained. The operation of the solenoid and its venting of the housing interior to the outlet chamber 16 is not, per se, a part of the present invention.

A flow control stem assembly, indicated generally at 30, is shown mounted on the cap 20 and is also of generally conventional construction. The assembly includes a body 31 mounted in the threaded bore 32 of cap 20 by a lower threaded coupling portion 33. A conventional gasket 34 is shown between a flange portion of body 31 and cap 20.

The rate of water flow through the valve may be adjusted by turning handle 35 which is mounted on stem 36 by the associated washer 37 and hex head nut 38. Stem 36 has a lower exteriorly threaded portion 39 adapted to be turnably mounted within an interiorly threaded portion 40 (with the seal 41, and seal cap 42) sealing them against water leakage through the assembly. Relative rotation between stem 36 and body 31 via handle 35 causes vertical disposition of the lower end 43 of the stem to control the extent of travel of the control rod, indicated generally at 60, and thus the extent of opening of the associated valve closure means 100, as more fully explained hereinafter. As seen in FIG. 1, an upper portion 62 of the control rod, indicated generally at 60, is aligned to and slidably received within a bore 44 provided within the stem 36, the lower end 43 abutting a washer 64 provided on the control rod.

The interior of the flow control stem assembly and, consequently, the interior of the cap 20 are vented by port 45 to the passage 26 associated with the electrically operated valve stopper 25 and associated ports 27 and 28 to the downstream line via outlet 12. The valve body, cap and flow control stem assembly thus far explained in detail are of generally conventional construction and, as stated hereinbefore, preferably made of brass. However, the internal operating parts of the valve apparatus hereinafter explained in detail are not considered to be conventional, but rather, are considered to be the exemplary embodiment of the improvement in water valve apparatus according to the present invention. Generally, these parts are contemplated as being made of lightweight, easily fabricated and inexpensive plastic parts which will have a long operating life in the water environment and will be protected from exteriorly applied damage by the surrounding brass valve housing formed by body 10, cap 20 and assembly 30.

As particularly contemplated within the present invention, cylinder insert means are provided for insertion within the inlet chamber 15 of the valve body, indicated generally at 10, to provide a cylinder therein in which a water pressure responsive piston means may be operated to control the opening and closing of port 13. In the exemplary embodiment, and as best seen in FIGS. 1 and 4, such cylinder insert means is indicated generally at 50 and includes an upper neck portion 51 having exterior threads 52 for removably connecting it into the threaded bore 32 of cap 20. Such mounting of the cylinder means to cap 20 may be effected prior to assembly of the cap 20 to body 10. The cylinder insert means is further provided with a flange 53 adapted to seat within cap 20 on the aforesaid assembly thereto with a recess 54 there below to receive O-ring 55 to seal such connection between the cylinder insert and cap.

Cylinder insert means, indicated generally at 50, according to the present invention, further includes the provision of a depending skirt 56, as seen in FIG. 4, which depends into the valve body inlet chamber 15, as seen in FIG. 1, when the cap 20 with the insert assembled thereto is mounted upon the body. The skirt portion 56 provides a cylinder within the valve body in the chamber 15 within which the piston means, as hereinafter explained, is operable to open or close valve closure 100. It is contemplated that the cylinder insert means be a one-piece molded plastic part and that it be provided, in the exemplary embodiment, with a plurality of water passage ports, as port 57, and a central bore 58 in a web portion 59 extending across the cylinder means between the upper neck portion 51 and lower skirt portion 56. The ports 57 are provided to allow water communication between the interior of skirt 56 and the neck portion interior which, as seen in FIG. 1, is open to the interior of cap 20, assembly 30 and the port 45. The central bore 58 is preferably provided to allow reception of the control rod, indicated generally at 60, which has a cylindrical body portion 61 reciprocally received through port 58. As noted hereinbefore, an upper portion 62 is received within the bore 44 of the stem while a lower flange portion 63 is seated on a gasket 77 within the piston means as hereinafter explained. From the foregoing, it can be seen that the control rod, indicated generally at 60, is adapted to slide vertically within the bore 58 of the insert cylinder, under the limitation of the positioning of stem 36, and is normally biased downwardly in FIG. 1 via the coil spring 65 extending between the underside of web 59 and the control rod flange 63.

As further particularly contemplated within the present invention, piston means, indicated generally at 70 and 80, are provided within the cylinder insert for operating valve closure 100 in response to differential water pressures within the cylinder skirt 56 above and below the piston means. In the exemplary embodiment, such piston means comprise a generally cup-like inner piston member, indicated generally at 70, and an outer, generally cup-like piston member, indicated generally at 80. As best seen in FIGS. 1 and 4, the inner piston member, which is preferably a one-piece plastic molded part, includes a generally cylindrical body 71 having a top peripheral, radially extending flange 72. The underside of flange 72 is provided with a depending annular seal engaging rib 73 for seating in the seal means, indicated generally at 90, as hereinafter explained. A single sidewall port 74, preferably on the order of about 1/32 of an inch in diameter, is provided in the body portion 71 while a bore 73 is provided in the bottom wall 76, each for reasons as will become apparent hereinafter.

The outer piston member, indicated generally at 80, is also preferably made of a one-piece molded plastic part having generally imperforate base 81 and top flange 82 portions but a perforate or screen-like body portion, indicated generally at 83, as best seen in FIG. 6. The body portion is preferably formed by a plurality of vertical posts 84 integral with said base 81 and top flange 82 and a plurality of vertically spaced, horizontal ring portions 85 formed integrally with said posts 84. The posts 84 are horizontally spaced about the body, as best seen in FIG. 4, so that the plurality of openings, indicated generally at 86, are provided where the spacings between the rings 85 intersect the spacings between the vertical posts 84. In the exemplary embodiment, therefore, the outer piston, indicated generally at 80, has a screen-like body, indicated generally at 83, provided with a plurality of small openings, indicated generally at 86, each of which is preferably smaller than the port 74 in the inner piston member, indicated generally at 70. The outer piston member is further provided with a vertical bore 87 through the face 81 as seen in FIGS. 1 and 4 herein.

The inner and outer piston members, indicated generally at 70 and 80 respectively, are nested, one in the other with the inner member flange 72 overlying the outer member flange 82. Ring seal means, indicated generally at 90, are provided in between said flanges 72 and 82 to be clamped therebetween and for sealing against the inner wall of the cylinder provided by skirt 56. As best seen in FIGS. 4 and particularly FIG. 5, such ring seal means includes an annular body or web 91 having a pair of annular oppositely and radially outwardly extending wiper portions 92 and 93 adapted to wipe sealingly along the inner walls of the cylinder skirt portion 56. A central bore 94 is provided to allow mounting of the ring seal means about the body 71 of the inner piston member, indicated generally at 70, with a depending inwardly biased wiper portion 95 adapted to seal thereabout. A center outer guide rib or portion 96 is provided between the wiper portions 92 and 93 to center the seal ring and piston means within the cylinder and to absorb any side thrust, due to water flow in the valve body, which might otherwise cause the seal contact with the cylinder walls to be broken. If the seal is broken, foreign substances, such as sand, can get in between the seal lips or wipers and cause the valve to fail. Such failure is avoided by providing the guide rib 96 between the seal lips or wipers 92 and 93 in accordance with the present invention.

Means are provided for positioning the piston means, indicated generally at 70 and 80, together with the ring seal, indicated generally at 90, clamped therebetween, within the cylinder skirt 56 for vertical movement therein. In the exemplary embodiment, such means include the provision of the aforedescribed control rod, indicated generally at 60, which sits within the inner piston member on gasket 77 and biases it downwardly in FIG. 1 toward the port 13. Further, a seal retainer, indicated generally at 110, is secured by fastening means, as rivet 78, to the piston means with the closure member 100 positioned between the retainer and the underside of the outer closure member, indicated generally at 80. The fastening means, as rivet 78, may also position gasket 77 and hold it within the inner piston member as seen in FIG. 1. The seal retainer includes a body 111 provided with a central bore 112 to receive rivet 78 therethrough and is provided with guide fins 113 extending down through the port 13. The piston means, indicated generally at 70 and 80, are therefore positioned within the cylinder skirt 56 by the combined action of the retainer guide fins 113 vertically slidable in port 13 and the control rod which is biased to seat down within the interior of the inner piston member on the associated gasket 77.

When the valve apparatus is operated as an electrically controlled valve, as in the exemplary embodiment of FIGS. 1 through 6, the valve is normally held in a closed position due to the presence of water pressure within the interior of the skirt portion 56 above the piston means. When water, under pressure, is present in the conduit 17 and the inlet chamber 15, it will pass through the screen-like body portion of the outer piston member 80 and through port 74 in the inner piston member 70 to the interior of the cylinder 56 above the piston means. Such water pressure within the interior of the cylinder above the piston means will act upon the entire effective area of the piston means, defined by the outer edges of the seal and extending inwardly to the outer surfaces of the control rod. The same water pressure acting within chamber 15 acts on a smaller effective surface area of the piston means defined again by the area starting with the periphery or outer area of the seal means 90 but extending inwardly only as far as the outer edges of closure member 100. Therefore, absent venting of the interior of the cylinder 56 above the piston means, the valve apparatus will be in a normally closed condition. Upon opening of the valve 25 by actuation of solenoid 24, the interior of the cylinder 56 above the piston is vented through port 45, which is preferably two diameters larger than port 74, to the down line or outlet chamber 16 via passages 25, 26, 27 and 28, which also preferably have diameters twice that of port 74, reducing the pressure within the cylinder above the piston means and allowing upstream water pressure to open the valve. Closure of valve 25 will allow restoration of such internal pressure above the piston means within the cylinder 56 and consequent closing of the valve, particularly with the aid of the spring 65.

When the valve apparatus, according to the present invention, is to be operated hydraulically, the alternative exemplary embodiment of valve body, cap, and control stem assembly components of FIG. 7 may be employed. Referring to FIG. 7, the hydraulically actuated alternative valve apparatus construction employs a similar valve body, indicated generally at 210, to that employed in the exemplary embodiment of FIGS. 1 through 6 without, however, the provision of passage 28. The alternative cap 220 is similar to that of the embodiment of FIGS. 1 through 6 but the flange or boss 221 is provided to receive a hydraulic line connection rather than the solenoid valve connection of FIG. 1. As seen in FIG. 7, the alternative exemplary embodiment of cap 220, includes the provision of a bored and tapped hole 222 to receive an end fitting 223 of a hydraulic line 224. Passages 225 and 226 are provided in the cap to connect with the associated bores 45 and 151 as illustrated. No modification need be made in the flow control stem assembly, indicated generally at 30, so long as the alternative cap passage 225 is adapted to mate with the port 45 provided for therein.

In the alternative exemplary embodiment of FIG. 7, the cylinder insert means, indicated generally at 250, may be made in the same manner as that described in connection with the exemplary embodiment of FIGS. 1 through 6 with the single addition of a port 151 to mate with the passage 226 as aforementioned. Further, the inner piston member, indicated generally at 270, in the alternative exemplary embodiment may be made exactly as that in the embodiment of FIGS. 1 through 6 with the exception of the sidewall port 54 which is deleted in the alternative exemplary embodiment. The outer piston member, indicated generally at 80, the ring seal means, indicated generally at 90, and the other associated parts not illustrated in FIG. 7 may all be made in the same manner as the corresponding part in the first exemplary embodiment of FIGS. 1 through 6.

When operating the water valve apparatus of the present invention as a hydraulically actuated valve, the piston means, including the inner piston indicated generally at 270 and outer piston member indicated generally at 80, with the ring seal means indicated generally at 90 clamped therebetween, may be forced downwardly into a port closure position by introducing hydraulic fluid through line 224 into the cylinder insert means, indicated generally at 250, above the piston means. By applying sufficient hydraulic pressure through line 224, the inlet water pressure may be overcome to maintain the valve port 13 closed via the piston means and associated valve closure member 100. Such hydraulic pressure may be relieved and the interior of the cylinder above the piston means vented by relieving the hydraulic line pressure to allow opening of the water valve apparatus under the urging of inlet water pressure whenever desired.

From the foregoing, it can be seen that the objects and advantages of the present invention are attained in each of the exemplary embodiments of water valve apparatus according to the present invention. The inexpensive, easily manufactured plastic movable parts utilized in the subassembly of the present invention, with very slight modification thereof, may be utilized in either an electrically operated water valve apparatus or a hydraulically operated water valve apparatus. Therefore, manufacturing operations may be set up to mass produce the few inexpensive plastic parts required for the within valve apparatus subassembly and the parts utilized in either an electrical or hydraulic valve apparatus depending upon whether a few holes, as ports 74 and 151, are drilled or not. A uniformly constructed and operating subassembly of movable plastic parts are therefore provided in accordance with the present invention for utilization in an otherwise conventional metallic, preferably brass, valve housing to provide a long lasting durable water valve apparatus in accordance with the present invention.

Having thus described two exemplary embodiments of water valve apparatus according to the present invention, it should be noted that these embodiments are intended to be exemplary only and that other embodiments, modifications and adaptations of the presently disclosed valve apparatus may be made within the scope of the present invention.

WE CLAIM:

1. In a water valve apparatus including a body having inlet and outlet chambers divided by a valve port, a port closure member for closing said port to the passage of water therethrough, and a cover means on said base having water passage means for venting water flow therethrough, the improvement comprising the provision of:

cylinder insert means for insertion within said inlet chamber to receive a piston means therein, said cylinder insert means including an upper portion releasably connected into said cover means with the interior thereof in communication with said water passage means in said cover, said cylinder insert means upper portion being provided with a threaded marginal end portion to be turned into an interiorly threaded bore in said cover means, and wherein said cylinder insert includes a depending cylindrical skirt having a hollow interior to receive said piston means, and a ported web is formed between and integrally of said upper portion and said depending skirt portion;

piston means associated with said port closure member; and means for positioning said piston means within said cylinder insert means with one side thereof facing into said interior of said cylinder insert means and an opposite side thereof exposed to the interior of said inlet chamber and any water pressure therein.

2. The improvement in water valve apparatus of claim 1 wherein said means for positioning said piston means within said cylinder comprises:

a control rod associated with said piston means within said depending skirt and extending upwardly through a port in said ported web.

3. The improvement in water valve apparatus of claim 2 wherein:

spring biasing means are provided about said control rod between an underside of said web and a flange provided on said control rod to bias said rod and associated piston means and closure member toward said valve port.

4. The improvement in water valve apparatus of claim 2 wherein said means for positioning said piston means within said cylinder also comprises:

seal retainer means underlying said piston means for retaining said port closure member thereunder and includes depending guide means extending through said valve port in lateral engagement therewith for aligning said closure means to said port and aligning said piston means within said cylinder in cooperation with said control rod.

5. In a water valve apparatus including a body having inlet and outlet chambers divided by a valve port, a port closure member for closing said port to the passage of water therethrough, and a cover means on said base having water passage means for venting water flow therethrough, the improvement comprising the provision of:

cylinder insert means for insertion within said inlet chamber to receive a piston means therein, said cylinder insert means including an upper portion releasably connected into said cover means with the interior of said cylinder in communication with said water passage means in said cover;

piston means associated with said port closure member wherein said piston means comprises an inner cup member, said inner cup member being provided with at least one port through a sidewall thereof; and an outer cup member positioned coaxially and partially about said inner cup member, said outer cup member having a sidewall formed with a plurality of openings smaller than said one port to form a screen around said inner cup through which inlet water must pass to enter said inner cup through said one port; and means for positioning said piston means within said cylinder insert means with one side thereof facing into said interior of cylinder insert means and an opposite side thereof exposed to the interior of said inlet chamber and any water pressure therein.

6. The improvement in water valve apparatus of claim 5 wherein:

said inner cup member one port is provided with a diameter no larger than approximately one half of the narrowest diameter of said water passage means venting water pressure from within said cylinder.

7. The water valve apparatus subassembly of claim 6 wherein:

said piston means first and second parts comprise a pair of nested inner and outer members and said outer of said members has a multiported sidewall providing a filtering screen about said inner of said members.

8. A water valve apparatus subassembly of plastic parts adapted to be assembled into a brass valve body and cap, said subassembly comprising:

cylinder means for providing a cylinder within said valve body to receive a water pressure actuated piston means, said cylinder means including an upper connector portion for connection into said brass valve cap and a depending skirt portion forming said cylinder;

piston means for receiving water pressure on opposite sides thereof and including first and second assembled parts clamping a ring seal therebetween, said seal extending radially outwardly of said piston parts, said first assembled part comprising an inner cup member provided with at least one port through a sidewall thereof and said second assembled part comprising an outer cup member having a sidewall formed with a plurality of openings smaller than said one port to form a screen around said inner cup through which inlet water must pass to enter said inner cup through said one port;

a valve stopper means for closing a valve port in said brass valve body;

means for connecting said piston means and said stopper means for concurrent movement; and means for mounting said connected piston means and stopper means within said cylinder skirt portion for opening and closing said valve port in response to differential pressures within said valve apparatus between the interior of said cylinder above and below said piston means.

9. A water valve apparatus subassembly of plastic parts adapted to be assembled into a brass valve body and cap, said subassembly comprising:

cylinder means for providing a cylinder within said valve body to receive a water pressure actuated piston means, said cylinder means including an upper connector portion for connection into said brass valve cap and a depending skirt portion forming said cylinder;

piston means for receiving water pressure on opposite sides thereof;

a valve stopper means for closing a valve port in said brass valve body;

means for connecting said piston means and said stopper means for concurrent movement; and means for mounting said connected piston means and stopper means within said cylinder skirt portion for opening and closing said valve port in response to differential pressures within said valve apparatus between the interior of said cylinder above and below said piston means, wherein said means for mounting said piston means within said cylinder skirt portion comprises:

a control rod seated on one side of said piston means and slidably received through a port in said cylinder means aligned to said depending skirt portion;

means for biasing said rod away from said cylinder and toward said piston means; and guide means provided on an opposite side of said piston means for extending through the valve port, said piston means being thereby guided for axial movement within said cylinder means relative to said valve port by the combined action of said control rod and port associated guide means.

10. A method of assembling a water valve apparatus, including a valve body having inlet and outlet chambers divided by a partition in which a valve port is located and an upwardly opening internally threaded bore into which a cover is mountable, said cover having an internally threaded coupling member, comprising the steps of:

assembling a pair of nested cup-like piston members together with a ring seal means disposed between flange means provided on each, a seal retainer having guide means depending therefrom to the underside of said members with a port closure means therebetween and holding all of the same in such assembled relation by a fastening means;

positioning said assembled members, seal and closure means and retainer in said valve body with said retainer guide means passing through the valve body valve port;

loosely positioning a control rod with a spring means thereabout in said valve body seated by a lower flange within said cup-like piston members;

mounting a cylinder insert means by an externally threaded neck portion to said cover internally threaded coupling member with a cylindrical skirt portion of said insert means depending from said cover;

locating said cylinder skirt portion over said control rod and moving it coaxially of and over said control rod and piston means to place all of the same in assembled relation upon turning of said cover down upon said valve body.

* * * * *